UNITED STATES PATENT OFFICE.

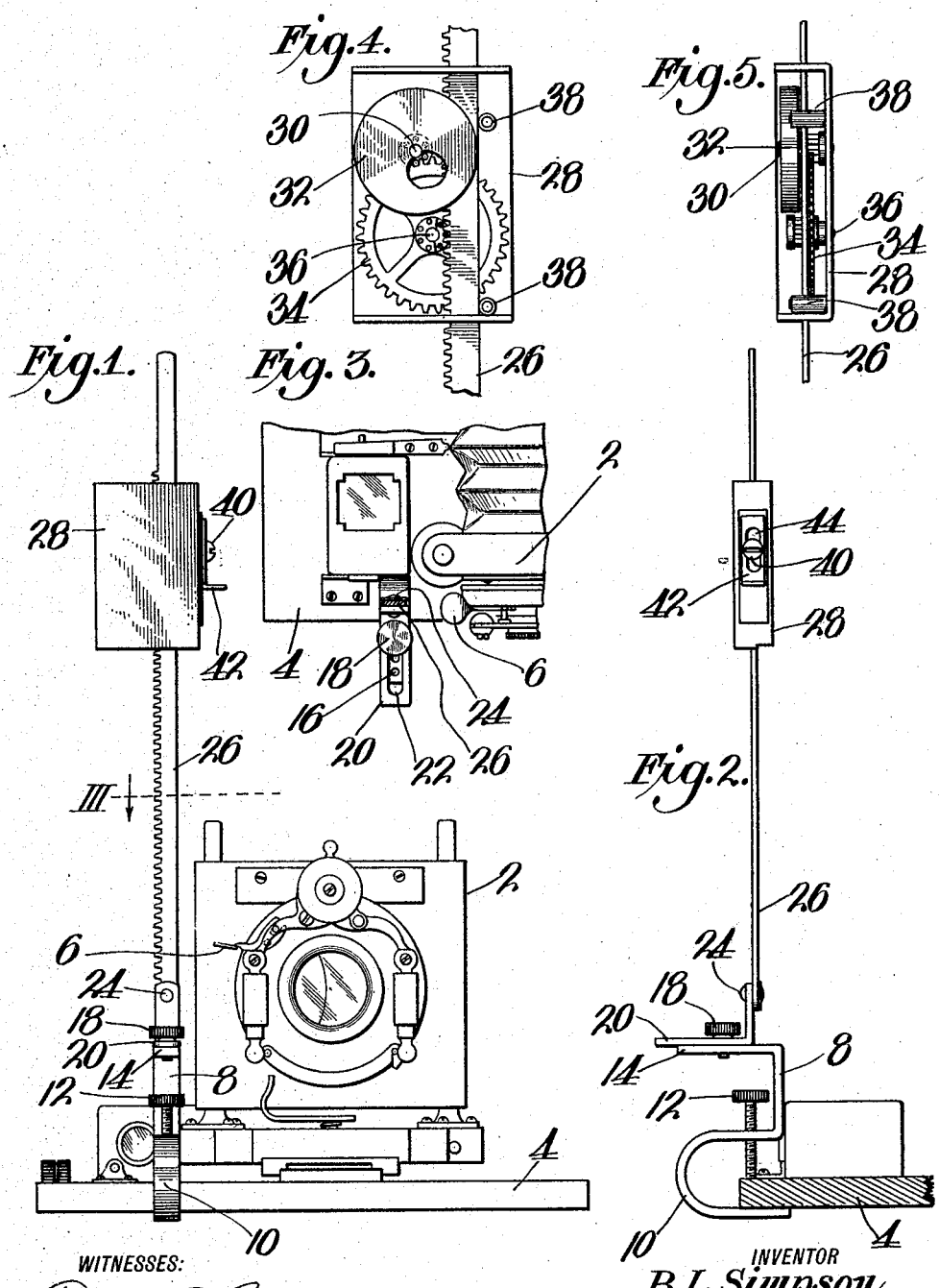

BENJAMIN L. SIMPSON, OF KANSAS CITY, MISSOURI.

AUTOMATIC SHUTTER-OPERATING DEVICE FOR CAMERAS.

1,146,964.  Specification of Letters Patent.  Patented July 20, 1915.

Application filed December 16, 1913. Serial No. 806,965.

*To all whom it may concern:*

Be it known that I, BENJAMIN L. SIMPSON, a citizen of the United States, residing at Kansas City, in the county of Jackson and State of Missouri, have invented certain new and useful Improvements in Automatic Shutter-Operating Devices for Cameras, of which the following is a specification.

This invention relates to automatic shutter operating devices, and the principal object in view is to produce an improved device whereby a camera shutter may be automatically tripped within a predetermined interval of time after the device has been set.

Another object is to provide a device entirely separate and independent of the camera itself, and which may be attached thereto when occasion arises for its use, as when the operator, for example, desires to appear in the view on which the camera is being focused.

Another object is to construct such a device having complete provision for adjusting the same for use with different sizes and types of cameras.

With these objects in view the invention comprises various novel and peculiar features of construction as hereinafter more particularly described and claimed, and to afford a full understanding thereof reference will be had to the accompanying drawing, forming a part of this specification, and in which—

Figure 1 is a front elevation of a portion of a camera having my device applied thereto; Fig. 2 is a side view of the same, showing the adjacent portion of the camera leaf in section; Fig. 3 is a section on the line III—III of Fig. 1, looking down; Fig. 4 is an interior view of the sliding tripping member and showing a fragment of the supporting rack; and Fig. 5 is an edge view of the same.

Referring to the drawing, an ordinary folding camera 2 is shown, the box being omitted with the exception of the hinged leaf 4 on to which the camera 2 is drawn when in use. My improvement is designed to be detachably clamped to the front edge of this leaf at that side of the camera which carries the shutter operating finger 6, and comprises a bracket member 8 formed at its lower end into a yoke 10 for fitting the edge of the leaf 4. A clamping screw 12 is carried by one arm of the yoke whereby the same may be detachably secured to different thicknesses of material. The upper portion of the bracket comprises a horizontal arm 14 provided with a series of threaded openings 16 for receiving a clamping screw 18. The arm 14 supports an angle piece 20 the horizontal arm of which is provided with a slot 22 through which the screw 18 passes into engagement with one of the openings 16. This arrangement of horizontal arms with the plurality of openings and the slot 22 gives a wide range of lateral adjustment, and also permits swinging the angle piece about a vertical axis before the screw 18 is clamped, in order to position the device properly relatively to the shutter operating finger 6. To the vertical arm of the angle piece 20 is pivoted with a tight fit at 24 a rack bar 26 of suitable length, upon which is mounted the sliding tripping member, which comprises an oblong casing 28 having suitable end openings for the passage of the rack bar. Upon a stud 30 within the casing is mounted a fly wheel 32 the hub of which is geared, as shown, to a gear wheel 34, the diameter of which is approximately equal to the width of the casing 28, said gear wheel being journaled on a stud 36 with its hub geared directly to the toothed edge of the rack bar. The opposite edge of the rack bar rides against a pair of suitable rollers 38 journaled within the casing. Secured to the exterior of one of the side walls of the casing 28 by means of a clamping screw 40 is an angle piece 42, the clamped arm of which is provided with a slot 44 so that the same may be properly adjusted. The projecting arm of the angle piece 42 forms a tripping lug designed to engage and operate the shutter operating finger 6.

In the operation of the device, the same is clamped by means of the yoke 10 and screw 12 to the hinged leaf of the camera, as illustrated in Figs. 1 and 2, and the jointed construction of the device permits it to be adjusted into whatever position is necessary to insure the movement of the tripping lug 42 in a path which will cause it to engage the finger 6. The manner of mounting the tripping lug also facilitates bringing about this adjustment. After the camera has been properly focused, the casing 28 is elevated to a point along the rack bar such that the time consumed in its descent will be sufficient to allow the operator to take his place in front of the camera. A slight downward push on the casing will suffice to start the rotation of the wheels 32 and 34 and cause the casing to move down the rack bar by gravity, and the greater the initial impulse the more rapid will be the descent and a correspondingly briefer interval will be consumed before operation of the shutter. The length of interval may also be varied by tilting the rack bar to retard by friction the movement of the casing, making whatever other adjustments may be necessary to insure engagement of the tripping lug with the finger 6.

From the foregoing it will be apparent that I have devised a simple and effective means for carrying out the objects of my invention, and while I have illustrated and described what now appears to me to be the preferred form of the same, I desire to reserve the right to such variations and modifications as may properly fall within the scope of the appended claims.

I claim:

1. In camera shutter operating devices, the combination of a bracket for fitting over the edge of the leaf or door of a camera when said leaf or door is open, means for clamping the bracket adjustably to the leaf, an angle piece horizontally adjustable on the bracket, a bar pivotally carried in an upright position by the angle piece, a weight member slidingly mounted on the said bar, and an arm projecting from the weight member and adapted when moving downward on the bar to engage and trip the shutter-operating finger of the camera as the said arm passes the horizontal plane of said shutter-operating finger during downward travel of the weight member on said bar.

2. In camera shutter operating devices, the combination of a bracket fitting over the edge of the leaf or door of a camera when said leaf or door is open, means for clamping the bracket adjustably to the leaf, an angle piece horizontally adjustable on the bracket, a bar pivotally carried in an upright position by the angle piece, a weight member slidingly mounted on the said bar, an arm projecting from the bar to engage and trip the shutter-operating finger of the camera as the arm passes the horizontal plane of said shutter-operating finger during the downward travel of the weight member on said bar, and means actuated by the downward travel of the weight member on the bar to retard the speed of downward movement of said weight member.

In testimony whereof, I affix my signature, in the presence of two witnesses.

BENJAMIN L. SIMPSON.

Witnesses:
 CHAS. W. GERARD,
 G. Y. THORPE.

Copies of this patent may be obtained for five cents each, by addressing the "Commissioner of Patents, Washington, D. C."